June 6, 1961  S. S. OSDER ET AL  2,987,276
AIRCRAFT FLIGHT CONTROL SYSTEM
Filed March 2, 1959  2 Sheets-Sheet 1
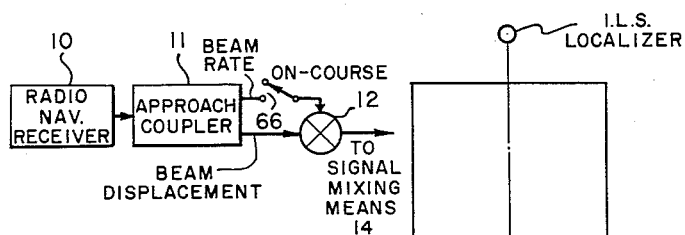
FIG.3.
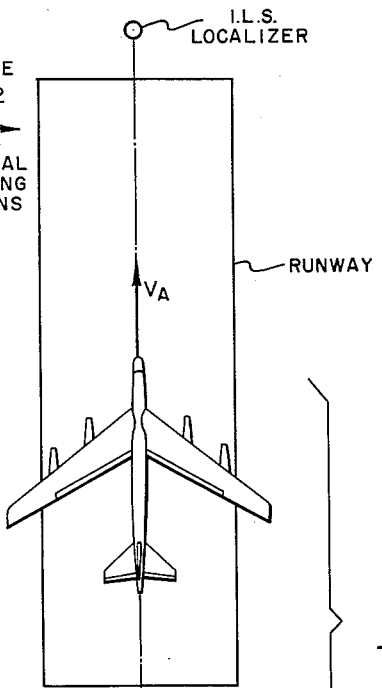
FIG.1.
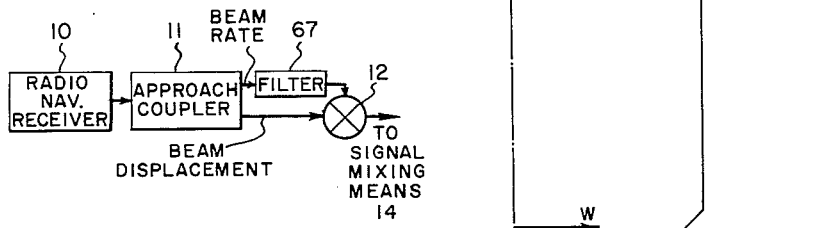
FIG.4.
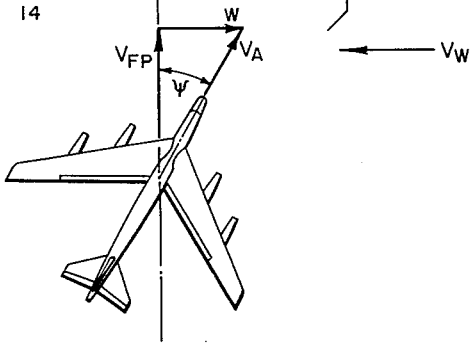
INVENTORS
STEPHEN S. OSDER
STEPHEN J. MATAVA
BY
ATTORNEY

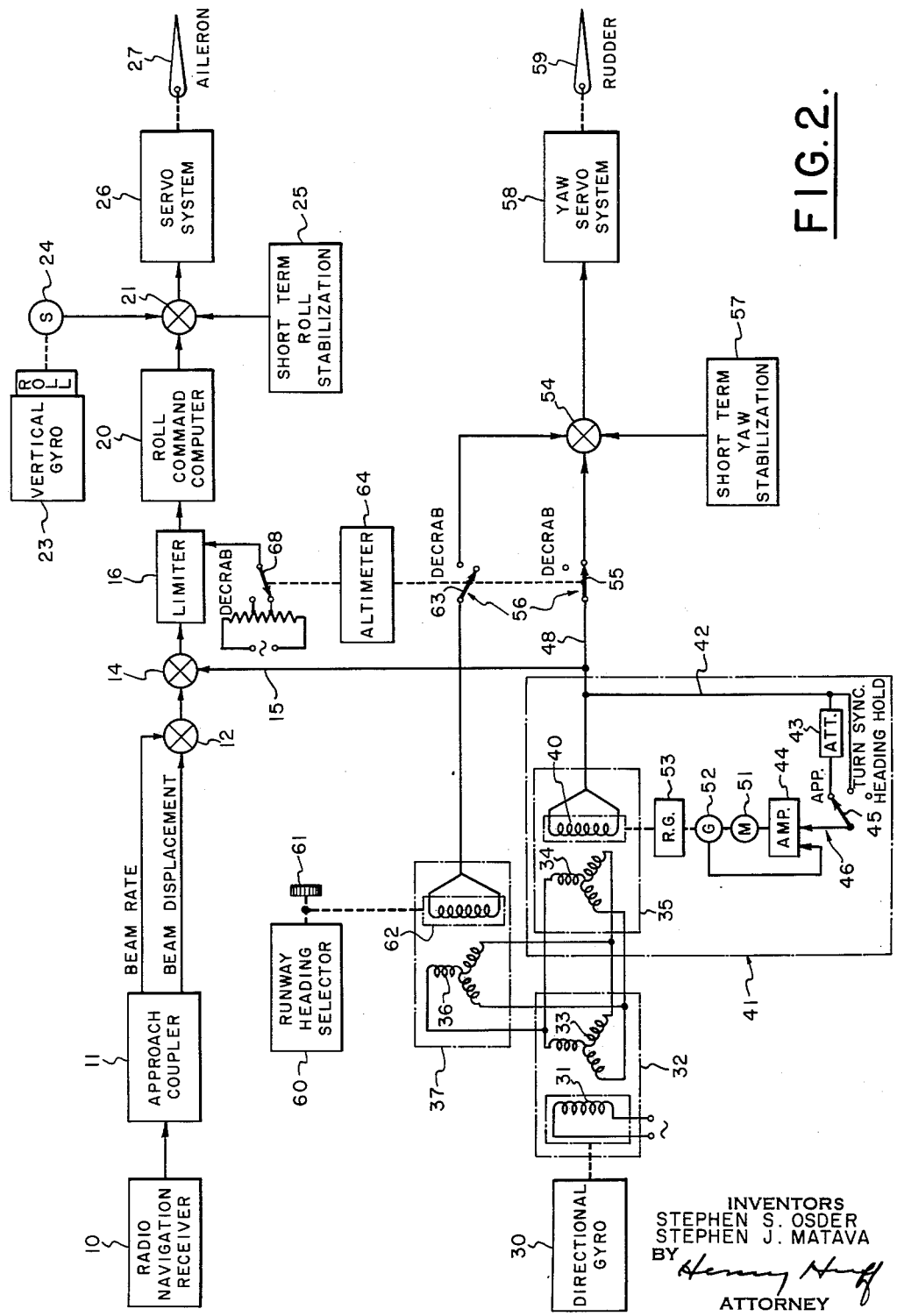

2,987,276
AIRCRAFT FLIGHT CONTROL SYSTEM

Stephen S. Osder, Wantagh, and Stephen J. Matava, Syosset, N.Y., assignors to Sperry Rand Corporation, a corporation of Delaware
Filed Mar. 2, 1959, Ser. No. 796,502
13 Claims. (Cl. 244—77)

This invention relates to an aircraft flight control system for guiding an aircraft along a radio defined course and more particularly for automatically guiding a radio controlled aircraft to a safe landing on a runway, especially when a cross wind prevails.

In aircraft instrument landing systems (ILS), localizer and glide slope radio beams are generated from ground based transmitting stations located adjacent to the runway. The intersection of the radio beams defines the desired course which the aircraft is to travel in approaching the runway. The localizer beam guides the aircraft with respect to a fixed or determinable azimuthal course of flight. The glide slope beam serves the purpose of directing the aircraft on a fixed or determinable vertical course of flight as it approaches the runway. Usually, an aircraft is guided simultaneously by signals from both localizer and glide path transmitters so that the desired course of approach is defined in the horizontal plane by azimuthal heading and in the vertical plane by rate or angle of descent. The present invention is primarily concerned with lateral control of an aircraft while it is being guided by signals from a localizer beam.

During the time when the attitude of the aircraft is being controlled by signals proportional to the lateral deviations of the aircraft from the localizer, it is desirable to provide a reference heading with respect to the long period heading of the craft in order that short period flight path damping may be achieved with respect to the long period heading rather than with respect to a fixed reference. This is particularly advantageous when a cross wind prevails which requires the airplane to maintain a crab angle in order to fly along a desired ground track or course defined by the radio beam.

As the aircraft nears the runway, it is necessary to provide lateral flight path damping which does not depend upon the radio signals. Normally, radio beam rate signals are usable for damping purposes but they become more and more erratic and noisy as the craft approaches the runway until ground effects render them useless. In lieu thereof, lateral flight path damping by means of a heading-derived signal is necessary to provide more and more usable damping information to maintain the airplane on the proper flight path towards the runway.

When a cross wind prevails, immediately prior to landing the heading of the aircraft must be aligned with the runway by removing the crab angle that was required during the earlier portion of the approach to compensate for the cross wind. This is necessary in order that, at the time of touchdown, the forward velocity vector of the aircraft will be aligned with the runway and the cross-course velocity of the aircraft will be zero thereby preventing undue strain on the landing gear. It is desirable, at touchdown, to maintain the heading of the aircraft aligned with the runway and to maintain minimum cross-course velocity of the aircraft for the maximum amount of time consistent with a safe aircraft attitude.

It is, therefore, a primary object of the present invention to provide an automatic flight control system for guiding aircraft more accurately along a radio defined course.

It is an additional object of the present invention to provide an aircraft flight control system having a flight path damping signal based upon the long period heading of the aircraft.

It is a further object of the present invention to provide an automatic aircraft landing system for radio controlled aircraft.

It is another object of the present invention to provide an automatic system for safely landing aircraft when a cross wind prevails.

The above objects are achieved by the provision of an automatic flight control system utilizing information primarily from a radio navigation receiver and a directional gyro. Lateral beam displacement and beam rate signals are applied to the roll channel of the automatic pilot. The heading signal from the directional gyro is connected to an electromechanical servo follow-up means which eliminates the long period steady state heading error signals due, for example, to cross wind and establishes as a reference heading measure the actual long period heading of the craft. The long period heading of the craft diverges from the flight path by the angle required due to cross wind, i.e., the crab angle. The heading follow-up signal from the follow-up means retains the flight path damping characteristics of the heading signal from the directional gyro and, when applied as a control signal to the roll and yaw channels of the automatic pilot, provides auxiliary beam damping and short period yaw damping which tends to return the aircraft to its long period heading.

During an approach, the heading follow-up signal is effective as an auxiliary damping control term in the roll channel and becomes the primary damping term as the craft nears the runway when the beam rate signal becomes unusable. The beam rate signal is therefore used only as a long period damping control term so that its noisy characteristic does not appear as an erratic control signal. The heading follow-up signal provides the craft lateral rate damping information at the shorter periods where the beam rate signal is unusable. During approach, the heading follow-up signal also provides short period yaw damping relative to the long period heading to supplement short term yaw stabilization control.

Immediately prior to touchdown while the aircraft is at a particular point above the runway, a decrab maneuver is automatically initiated, for example, by means of an altimeter. During the decrab maneuver, the heading follow-up signal continues to be applied to the roll stabilization channel while the runway heading error signal is applied to the yaw stabilization channel in lieu of the heading follow-up signal. By this action, the aircraft is made to yaw rapidly in a substantially flat turn to the runway heading while, simultaneously, the application of the heading follow-up signal to the roll channel causes the windward wing of the craft to drop slightly to maintain the craft heading aligned with the runway and to maintain minimum cross-course velocity of the aircraft, respectively, for an optimum time interval. Applying the heading follow-up signal to the roll stabilization channel also compensates for the aircraft's inherent tendency to drop a wing during a skid turn which, in the case of a skid turn to remove a crab angle, would be the leeward wing. During the optimum time interval provided by the present invention, the aircraft can be landed safely.

It will become apparent that the foregoing objects have been achieved by the present invention upon a study of the following disclosure when considered in connection with the accompanying drawings, wherein:

FIG. 1 is a diagram of an aircraft approaching a runway with a cross wind prevailing, FIG. 2 is a schematic block diagram of an embodiment of the present invention, FIG. 3 is a schematic block diagram of an alternative embodiment of a portion of FIG. 2, and FIG. 4 is a schematic block diagram of an additional embodiment of a portion of FIG. 2.

The present invention will be described with respect to a radio controlled approach in conjunction with an ILS type of landing for purposes of example. Aspects of the invention are equally applicable to other types of radio navigation, for example, omnirange systems, as will become apparent to those conversant with the art.

Referring to FIG. 1, an aircraft is schematically represented approaching a runway to execute a landing thereon. A cross wind is assumed to be prevailing having a velocity and a direction as indicated by the vector $V_W$. The long period heading of the aircraft is at a crab angle $\psi$ with respect to the runway to compensate for the prevailing wind in order to maintain the flight path of the aircraft aligned with the runway as established by the ILS localizer beam. The crab angle $\psi$ is also the angle which the forward velocity vector $V_A$ of the aircraft makes with the flight path velocity vector $V_{FP}$.

In order to achieve a safe landing, at the time of touchdown the forward velocity vector $V_A$ of the aircraft must be aligned with the runway heading while the aircraft is prevented from being blown across the runway. The present invention provides means for accomplishing the above automatically and simultaneously. Immediately prior to touchdown, the aircraft is automatically yawed in a substantially flat skid turn to remove the crab angle in order to align the aircraft heading with the runway. The time element between starting to decrab the aircraft and the actual touchdown on the runway is extremely critical since the prevailing wind is continuously acting on the airplane to blow it across the runway. The present invention extends the critical time interval appreciably by providing means for maintaining the windward wing in a slightly downward condition during the decrabbing and landing maneuver in a manner to be explained.

Referring now to FIG. 2, an embodiment of the present invention is shown utilizing a radio navigation receiver 10 that is mounted on the aircraft. Radio navigation receiver 10 provides D.C. signals based upon signals received from a ground based radio transmitter such as the localizer transmitter of an ILS. The D.C. signals from the receiver 10 have a magnitude and a polarity proportional to the lateral displacement and direction, respectively, of the aircraft with respect to the center of the localizer beam which defines the desired radio course. An approach coupler 11 is connected to receive the D.C. signals from the navigation receiver 10. The approach coupler 11, for example, may be similar to that described in Patent No. 2,801,059, entitled "Radio Controlled Craft Guidance System" of Herbert Hecht et al., issued July 30, 1957.

Within the approach coupler 11, the D.C. signals are modulated and converted to A.C. signals proportional to the lateral displacement of the aircraft from the localizer beam and to the lateral rate of displacement of the aircraft from the localizer beam in a manner more fully described in the aforementioned Patent No. 2,801,059. The purpose of the beam displacement signal is to provide a measure of the displacement and the direction of the craft with respect to the radio defined course. The purpose of the beam rate signal is to provide flight path damping with respect to the radio defined course. The beam displacement and beam rate signals from the approach coupler 11 are connected to a signal mixing means 12 where they are algebraically summed. The combined output of the signal mixing means 12 is connected together with a heading follow-up signal on lead 15 to the input of signal mixing means 14. The heading follow-up signal serves a dual purpose which will be more fully explained later. The signals into the signal mixing means 14 are algebraically summed and the output thereof is connected to a roll command computer 20 through a limiter 16. The limiter 16, the roll command computer 20 and many other components indicated by blocks in FIG. 2 may be similar to equivalent components described more fully in U.S. application Ser. No. 571,813, entitled "Aircraft Automatic Pilot" of Harry Miller and George F. Jude, filed March 15, 1956. The function of the limiter 16 is to limit the amplitude of the input signal to the roll command computer 20 and thereby limit the magnitude of the commanded bank angle to prevent the craft from rolling to a dangerous bank angle. By varying the potential applied to the limiter 16 as schematically shown, the bank angle limits determined by the limiter 16 may be varied in a manner to be described. The roll command computer 20 serves primarily to smooth the roll command signals applied thereto. The output of the roll command computer 20 is connected to the input of signal mixing means 21 where the roll command signal is compared with a signal proportional to the roll attitude of the aircraft.

The roll attitude signal is obtained in a conventional manner from a vertical gyro 23 that has a roll pick-off connected to drive a synchro 24 which, in turn, is connected to provide an electrical input to signal mixing means 21. To provide signals indicative of the short-term attitude of the aircraft about the roll axis for short-term stabilization purposes, short-term roll stabilization means 25 may be connected to the signal mixing means 21. The short-term roll stabilization means 25 may, for example, be similar to that shown in the aforementioned patent application Ser. No. 571,813 and include as primary sensors a pair of roll accelerometers equally spaced above and below the aircraft's center of gravity to provide a measure of angular acceleration about the roll axis and may also include attenuating and filtering circuits.

The output of the signal mixing means 21 is connected to the input of the roll servo system 26 which, in turn, ias connected to drive the control rigging to position the ailerons 27. The roll servo system 26 may be a velocity type servo system as shown in the aforementioned patent application Ser. No. 571,813, or may be a displacement type of servo system as described in Patent No. 2,567,922, entitled "Automatic Pilot for Aircraft" of R. S. Brannin et al., issued September 18, 1951, provided, of course, the inputs to the displacement type of servo system are made compatible therewith.

To provide a signal represesive of the actual heading of the aircraft, a directional gyro 30 is connected to effectively drive the rotor 31 of a synchro generator 32 in accordance with the heading of the aircraft. Directional gyro 30 may, for example, be slaved to a flux valve so as to form part of a magnetically slaved gyroscopic compass apparatus, one type of which is shown in the aforementioned application Ser. No. 571,813. The terminals of rotor 31 are energized by an alternating potential. The stator 33 of synchro generator 32 has its windings connected to the corresponding windings of the stator 34 of synchro receiver 35 and to the corresponding windings of stator 36 of synchro receiver 37 in order that the potentials induced in the stator 33, which are representative of the aircraft heading, are applied to the stators 34 and 36.

The rotor 40 of synchro receiver 35 forms a part of and is driven by a yaw follow-up means generally indicated at 41. The potentials applied to the stator 34 induce an output potential in the rotor 40 depending upon their relative positions. The output of rotor 40 is connected, in the approach (APP) mode as shown, by lead 42 through an attenuator 43 to the input of amplifier 44 via the contact arm 45 of switch 46. The attenuator 43 may take the form of a resistor, for example. The yaw follow-up means 41 is an electromechanical servo which includes synchro receiver 35, attenuator 43, amplifier 44, servomotor 51, tachometer generator 52 and reduction gearing 53.

In the approach mode as shown, the amplifier 44 is connected to control motor 51 in accordance with the attenuated output of the rotor 40 of synchro receiver 35. Motor 51 is connected to drive the rotor 40 of synchro receiver 35 through reduction gearing 53 in a direction to reduce the output signal from the rotor 40 to zero. Yaw follow-up 41, thus, eliminates the long period steady state heading errors due, for example, to cross winds and establishes as a reference heading measure the actual long period heading of the aircraft while retaining the flight path damping characteristics of the heading signal. Motor 51 also drives tachometer generator 52 which, in turn, is connected to provide a rate feedback signal to the input of amplifier 44.

In the turn synchronizing mode, with contact arm 45 of switch 46 connected to the Turn Sync. position, the output of rotor 40 is directly connected by lead 42 to the input of amplifier 44. Yaw follow-up 41 is then in fast follow-up to rapidly rotate rotor 40 to wipe out the heading signal in a manner to be explained. In the heading hold mode, with contact arm 45 connected to the blank Heading Hold contact, the rotor 40 is held in a fixed position and the output from synchro receiver 35 is referenced to the aircraft heading at the time of switching into the heading hold mode to maintain the aircraft on a fixed heading.

The output of rotor 40 is also connected by lead 15 to signal mixing means 14 and thence to the roll servo system 26 as explained previously. The output of rotor 40 is further connected to the input of signal mixing means 54 when the contact arm 55 of decrab switch 56 is in its lowermost position as shown. The output of short-term yaw stabilization means 57 is also connected to the input of signal mixing means 54. Short-term yaw stabilization means 57 may be of the type shown in the aforementioned application Ser. No. 571,813, and include a pair of yaw accelerometers, one mounted at the aircraft's center of gravity and the other mounted near the nose of the plane to provide a measure of angular acceleration about the yaw axis and may also include attenuating and filtering circuits. The output of the signal mixing means 54 is connected to the input of the yaw servo system 58. Yaw servo system 58 may also be of the type described in the aforementioned patent application Ser. No. 571,813. The output of the yaw servo system 58 is connected to drive the control rigging to position the rudder 59.

To provide a runway heading error signal representative of the heading of the aircraft with respect to the heading of the runway, runway heading selector 60 has a knob 61 mechanically connected for manually positioning the rotor 62 of synchro receiver 37 in accordance with the runway heading. The output potential of rotor 62, which is representative of the runway heading error, is connected to the input of signal mixing means 54 when contact arm 63 of switch 56 is in its uppermost position.

Contact arms 55, 63 and 68 of decrab switch 56 are ganged for simultaneous movement when actuated by an altimeter 64 in a manner to be explained.

To describe the operation of the embodiment of the invention shown in Fig. 2, it is assumed that the aircraft is making a radio controlled approach with a cross wind of constant velocity prevailing as shown in Fig. 1. As the aircraft initially turns to approach the localizer beam, the radio navigation receiver 10 provides signals indicative of the lateral departure of the craft from the radio defined course, i.e., the center of the localizer beam, which are converted in the approach coupler 11 to signals proportional to the beam displacement and beam rate. The beam displacement and beam rate signals are compared with the signal from the vertical gyro 23 in signal mixing means 21 and the output therefrom is a roll command signal into the roll servo system 26 which positions the ailerons 27 in a direction to bank the aircraft to approach asymptotically the center of the localizer beam.

Simultaneously, as the heading of the aircraft is changing during the turn, the directional gyro 30, by means of synchro generator 32, provides an electrical signal representative of the actual heading of the aircraft which is applied to synchro receiver 35. With the contact arm 45 of switch 46 in the Turn Sync. position, the output of synchro receiver 35 is directly connected through lead 42 to the input of amplifier 44 of yaw follow-up 41. With the full output of synchro receiver 35 applied to amplifier 44, motor 51 rapidly drives rotor 40 of synchro receiver 35 in fast follow-up thereby preventing any output from synchro receiver 35 from being effective in the roll and yaw servo systems 26 and 58, respectively.

As the aircraft continues to approach the localizer beam, a position is reached where contact arm 45 of switch 46 is switched, either manually or automatically, into the approach (APP) position as shown. This switching occurs when the aircraft is approximately stabilized on the beam after the initial bracketing of the beam has been accomplished and the beam displacement and rate signals are below predetermined minimum values which define "on-course" flight as, for example, defined in said Patent No. 2,801,059. Automatic actuation of an "on-course" switch is described in said Patent No. 2,801,059. In this position, the output of rotor 40 is attenuated by attenuator 43 before it is applied to amplifier 44. The attenuator 43 thus provides a means for controlling the response of yaw follow-up 41. Depending upon the characteristics, for example, resistance, of the attenuator 43, yaw follow-up 41 may be controlled to drive rotor 40 as slowly or as rapidly as desired. The slower that the yaw follow-up 41 rotates the rotor 40 to follow-up on the output signal therefrom, the more heading follow-up signal will be applied initially to the roll and yaw servo channels. The rate at which yaw follow-up 41 responds to the output from rotor 40 is adjusted as a function of the aerodynamic characteristics of the craft and the mode of control desired.

During the approach, the aircraft assumes a heading that compensates for its cross-course drift due to the constant velocity of the cross wind and the heading signal generated in synchro generator 32 is representative of the actual heading of the aircraft. With switch 46 in the position shown, yaw follow-up 41 slowly drives rotor 40 in accordance with an attenuated version of the heading signal to eliminate the constant heading error signal caused by the prevailing wind. When the yaw follow-up has rotated rotor 40 to reduce the output from rotor 40 to zero and the beam rate and beam displacement signals are zero, the aircraft is in a position as shown in the lower portion of Fig. 1. The flight path of the aircraft is aligned with the center of the localizer beam while its heading diverges therefrom by the crab angle. The heading reference thus established by the yaw follow-up 41 is based upon the long period heading of the aircraft.

Short period disturbances due to wind gusts, for example, which cause yaw excursions in excess of a predetermined rate determined by the follow-up response of the yaw follow-up 41 generate heading error signals with respect to the long period heading reference measure. The yaw follow-up 41 thus provides a means for producing a heading follow-up signal representative of the aircraft's deviation from the long period heading reference measure when this deviation occurs at relatively short oscillatory periods which are above the response capabilities of yaw follow-up 41. The heading follow-up signal from yaw follow-up 41 is applied as a control signal to the roll and yaw servo systems 26 and 58, respectively, via leads 15 and 48 with the decrab switch 56 in the downward position as shown. The roll and yaw servo systems 26 and 58, respectively, position the ailerons 27 and the rudder 57 accordingly in a direction to return the aircraft to the long period heading reference and to reduce the aircraft yaw rate to zero.

As the aircraft nears the runway, the output of the radio receiver 10 becomes more sensitive to aircraft deviations from the beam reference because of the convergent nature of the beam, and, as a consequence, the control period of the aircraft-flight control system combination tends to decrease. That is, if the system were not adequately damped, the oscillatory period would decrease as the runway is approached. At these shorter control periods, the beam rate signal from the approach coupler 11 becomes erratic and must be either filtered or rendered ineffective by disconnecting it as a control signal, the latter alternative being shown in FIG. 3, where the contact arm 65 of switch 66 is shown in its uppermost position in the on-course mode. When the beam rate signal is filtered to minimize the effects of noise, for example, by increasing the ratio of the beam rate to the beam displacement feedback signals within the approach coupler 11 shown in said Patent 2,801,059 or as shown in FIG. 4 by utilizing a filter circuit 67 responsive to the beam rate signal from the approach coupler 11, the filtered beam rate signal does not provide adequate path damping information at the shorter control periods which occur as the runway is approached. Thus, the heading follow-up signal, when applied to the roll and yaw channel, becomes the primary damping term during the final phases of the approach.

At any time during the approach sequence, the pilot may adjust knob 61 of runway heading selector 60 to rotate the rotor 62 in accordance with the heading of the runway to provide an output signal from synchro receiver 37 proportional to the aircraft bearing with respect to the runway, i.e., the runway heading error.

At a particular point above the runway immediately prior to touchdown, for example, eight feet above the runway, contact arms 55, 63 and 68 are actuated by altimeter 64 to their uppermost positions to initiate a decrab maneuver. This disconnects the heading follow-up signal from the yaw servo system 58 and connects the runway heading error signal from synchro receiver 37 thereto. The yaw servo system 58, in response to the runway heading error signal, drives the rudder 59 in a direction to rapidly yaw the aircraft in a flat skid turn to remove the crab angle thereby aligning the longitudinal axis of the aircraft with the runway.

As the aircraft yaws, a heading error signal referenced to the long period aircraft heading is generated in synchro generator 32. The heading error signal so generated when applied to synchro receiver 35 produces a heading follow-up signal to the roll servo system 26 that drives the ailerons 27 in a direction which would tend to bank the aircraft to return it to the long period reference heading that it had before decrabbing. In effect, this causes the windward wing of the aircraft to drop. The purpose of the yaw follow-up 41 at this time is to respond to the output of synchro receiver 35 at a rate which will provide a heading follow-up signal on lead 15 that will cause the roll servo system 26 to drive the ailerons 27 to bank the aircraft in order to compensate for the inherent tendency of the aircraft to drop its leeward wing and to maintain a minimum cross-course velocity of the aircraft for an optimum amount of time.

With the aircraft only a few feet above the runway, the maximum bank angle must be limited to a relatively small angle, for example, less than 5°. In the embodiment shown, the maximum bank angle is adjusted to a lower value automatically when the decrab maneuver is initiated. At this time, altimeter 64 positions contact arm 68 to its uppermost position thereby varying the potential applied to the limiter 16 in order to limit the amplitude of the signal into the roll command computer 20 to prevent the craft from rolling to a dangerous bank angle.

At touchdown, the attitude of the aircraft is extremely critical and a compromise must be reached between the aircraft attitude required for a safe landing and the optimum amount of time desired to perform the decrab maneuver and successfully land the aircraft. The present invention appreciably extends this critical time interval by simultaneously decrabbing the aircraft and maintaining the windward wing of the aircraft slightly down thereby aligning the longitudinal axis of the aircraft, and necessarily its forward velocity vector, with the runway while maintaining a minimum cross-course velocity of the aircraft for a maximum amount of time consistent with a safe landing.

It is desirable to vary the effectiveness of the servo systems as a function of airspeed, control surface effectiveness, aerodynamic stability and other related parameters in order to maintain good aerodynamic response of the aircraft during the approach and landing. Means for accomplishing the above are described in the aforementioned patent application Ser. No. 571,813.

The decrab switch 56 is shown actuated by an altimeter 64 at a predetermined point above the runway. The operation of the altimeter 64 is extremely critical and it is advisable to actuate decrab switch 56 on the basis of accurate radio altimeter height information. Alternatively, decrab switch 56 may be actuated at a predetermined point above the runway from ground based equipment in lieu of airborne equipment, if desired.

For purposes of simplicity, means for obtaining coordination during turns has not been shown. One such means that is suitable is fully described in the aforementioned patent application Ser. No. 571,813.

While the invention has been described in its preferred embodiment, it is to be understood that the words which have been used are words of description rather than limitation and that changes within the purview of the appended claims may be made without departing from the true scope and spirit of the invention in its broader aspects.

What is claimed is:

1. An aircraft automatic flight control system for guiding an aircraft along a radio defined course comprising receiving means for producing a first control signal in response to the lateral displacement of the aircraft from a radio defined course, heading reference means for producing a signal representative of the heading of the aircraft, follow-up means responsive to said heading signal for establishing a long period heading reference and for producing a second control signal proportional to the short period deviations of the aircraft from said long period heading reference above a predetermined rate, roll servo means responsive to said first and second control signals for controlling the aircraft in roll in accordance therewith, and yaw servo means responsive to said second control signal for controlling the aircraft in yaw in accordance therewith.

2. An aircraft automatic flight control system for guiding an aircraft along a selected course defined by a radio beam from a transmitting station comprising means including a radio receiver for producing a first control signal and a second control signal varying respectively in accordance with the lateral displacement and the lateral rate of displacement of the craft from said radio defined course, means including a directional device for producing a signal in accordance with the heading of the craft, follow-up means responsive to said heading signal for producing a third control signal in accordance with the deviations of the aircraft from said heading in excess of a predetermined rate, roll servo means responsive to said control signals for controlling the aircraft in roll in accordance therewith, and yaw servo means responsive to said third control signal for controlling the aircraft in yaw in accordance therewith.

3. An aircraft automatic flight control system for guiding an aircraft along a radio defined course comprising means including a radio receiver for producing a first control signal and a second control signal varying respectively in accordance with the lateral displacement and the lateral rate of displacement of the craft from said radio defined course, means including a directional gyro for providing a signal representative of the heading of the aircraft, a synchro receiver having a stator connected to receive said heading signal and a rotor adapted to provide an output, means connected to drive said rotor in follow-up fashion in accordance with said output below a predetermined rate of change of heading for producing a third control signal in accordance with said output in excess of said predetermined rate of change of heading, roll servo means responsive to said control signals for controlling the aircraft in roll in accordance with the combination thereof, and yaw servo means responsive to said third control signal for controlling the aircraft in yaw in accordance therewith.

4. A system of the character described in claim 3 wherein said means connected to drive the rotor of the synchro receiver includes attenuating means for controlling the response thereof.

5. An aircraft automatic control system for guiding an aircraft along a radio defined course comprising means including a radio receiver for producing a first control signal and a second control signal varying respectively in accordance with the lateral displacement and lateral rate of displacement of the craft from said radio defined course, means including a directional gyro for providing a signal in accordancewith the heading of the craft, a synchro generator actuated in accordance with said heading signal, a synchro receiver having its stator electrically connected to said synchro generator and its rotor adapted to provide an output, means including electromechanical follow-up servo means responsive to said output for driving said rotor to establish a long period heading reference for producing a third control signal proportional to the short period deviations of said craft from said long period heading reference, roll servo means responsive to said control signals for controlling the aircraft in roll in accordance with the combination thereof, and yaw servo means responsive to said third control signal for controlling the aircraft in yaw in accordance therewith.

6. A system of the character described in claim 5 wherein said means for driving the rotor of the synchro receiver includes means for controlling the response of said electromechanical follow-up means.

7. An aircraft automatic landing system for guiding an aircraft to a landing along a radio defined course comprising receiving means for producing a first control signal in response to the lateral displacement of the aircraft from said course, heading reference means for producing a signal representative of the heading of the aircraft, follow-up means responsive to said heading signal to establish a long period reference heading measure for producing a second control signal in accordance with the short period deviations of said aircraft from said long period heading reference measure, means responsive to said aircraft heading signal including runway heading reference means for producing a third control signal representative of the heading of the aircraft with respect to the heading of the runway, roll servo means responsive to said first and second control signals for controlling the aircraft in roll in accordance therewith, yaw servo means for controlling the aircraft in yaw, and switch means for selectively connecting said yaw servo means in one condition to be responsive to said second control signal and in another condition to be responsive to said third control signal.

8. An aircraft automatic landing system for guiding an aircraft to a landing along a radio defined course comprising receiving means for producing a first control signal and a second control signal varying respectively in accordance with the lateral displacement and the lateral rate of displacement of the aircraft from said course, means including a directional device for producing a signal representative of the heading of the aircraft, follow-up means responsive to said heading signal for producing a third control signal representative of the deviation of the aircraft from said heading in excess of a predetermined rate, runway heading reference means for producing a signal representative of the heading of the runway, means responsive to said aircraft heading signal and said runway heading signal for providing a fourth control signal representative of the runway heading error, roll servo means responsive to said first, second and third control signals for controlling the aircraft in roll in accordance with the combination thereof, yaw servo means for controlling the aircraft in yaw, and means including switch means for selectively connecting said yaw servo means in one condition to be responsive to said third control signal and in another condition to be responsive to said fourth control signal.

9. A system of the character described in claim 8 wherein said follow-up means includes attenuating means for controlling the response of said follow-up means.

10. A system of the character described in claim 8 including limiting means responsive to said first, second and third control signals for limiting their effectiveness on said roll servo means whereby the craft is prevented from exceeding a predetermined bank angle.

11. An automatic landing system for guiding an aircraft to a landing on a runway along a radio defined course comprising receiving means for producing a first control signal and a second control signal varying respectively in accordance with the lateral displacement and the lateral rate of displacement of the aircraft from said course, means including a directional gyro for producing a signal representative of the heading of the aircraft, a synchro generator actuated in accordance with said heading signal, a synchro receiver having its stator electrically connected to said synchro generator and its rotor adapted to provide an output, means including electromechanical follow-up servo means responsive to said output for driving said rotor to produce a third control signal proportional to the deviations of said craft from said heading in excess of a predetermined rate, runway heading reference means for producing a signal representative of the heading of the runway, means responsive to said aircraft heading signal and said runway heading signal for providing a fourth control signal proportional to the runway heading error, roll servo means responsive to said first, second and third control signals for controlling the aircraft in roll in accordance with the combination thereof, yaw servo means for controlling the aircraft in yaw, means including switch means for selectively connecting said yaw servo in a first condition to be responsive to said third control signal and in a second condition to be responsive to said fourth control signal, and means for energizing said switch means at a predetermined point above the runway for changing from said first condition to said second condition whereby when a cross wind prevails which requires the airplane to maintain a crab angle, immediately prior to landing, the heading of the aircraft is aligned with the heading of the runway and the windward wing of the aircraft is maintained slightly down to maintain the craft aligned with the runway for an optimum time interval with a minimum cross-course velocity.

12. A system of the character described in claim 11 wherein said means including electromechanical follow-up servo means includes attenuating means for attenuating the output of said synchro receiver.

13. A system of the character described in claim 12 including limiting means responsive to said first, second and third control signals for limiting their effectiveness on said roll servo means whereby the craft is prevented from exceeding a predetermined bank angle.

References Cited in the file of this patent

UNITED STATES PATENTS

| | | |
|---|---|---|
| 2,676,770 | Schuck | Apr. 27, 1954 |
| 2,784,924 | Gille | Mar. 12, 1957 |
| 2,834,564 | Perkins et al. | May 13, 1958 |